B. A. LAKE.
CORN HUSKING MACHINE.
APPLICATION FILED SEPT. 30, 1921.

1,438,383.

Patented Dec. 12, 1922.
10 SHEETS—SHEET 1.

Inventor
Bertus A. Lake
Frease and Bond
Attorneys

B. A. LAKE.
CORN HUSKING MACHINE.
APPLICATION FILED SEPT. 30, 1921.

1,438,383.

Patented Dec. 12, 1922.
10 SHEETS—SHEET 2.

Fig. 2.

Inventor
Bertus A. Lake

Frease and Bond
Attorneys

B. A. LAKE.
CORN HUSKING MACHINE.
APPLICATION FILED SEPT. 30, 1921.

1,438,383.

Patented Dec. 12, 1922.
10 SHEETS—SHEET 4.

Fig. 4.

Inventor
Bertus A. Lake
By Frease and Bond
Attorneys

B. A. LAKE.
CORN HUSKING MACHINE.
APPLICATION FILED SEPT. 30, 1921.

1,438,383.

Patented Dec. 12, 1922.
10 SHEETS—SHEET 7.

Inventor
Bertus A. Lake
By Frease and Bond
Attorneys

B. A. LAKE.
CORN HUSKING MACHINE.
APPLICATION FILED SEPT. 30, 1921.

1,438,383.

Patented Dec. 12, 1922.
10 SHEETS—SHEET 10.

Inventor
Bertus A. Lake

By Frease and Bond
Attorneys

Patented Dec. 12, 1922.

1,438,383

UNITED STATES PATENT OFFICE.

BERTUS A. LAKE, OF BIGPRAIRIE, OHIO.

CORN-HUSKING MACHINE.

Application filed September 30, 1921. Serial No. 504,313.

*To all whom it may concern:*

Be it known that I, BERTUS A. LAKE, a citizen of the United States, residing at Bigprairie, in the county of Holmes and State of Ohio, have invented a new and useful Corn-Husking Machine, of which the following is a specification.

My invention relates to corn husking machines of the general character shown in the Tschantz Patent No. 1,155,173 issued September 28, 1915, which is at present owned by me.

The objects of the present invention are to provide a corn husker of this character in which a conveyer is provided located at an angle to the snapping rolls in order to carry the stalks into the snapping rolls at an angle thereto.

A further object is the provision of feeding wheels arranged to receive the stalks from the conveyer and pass them into the snapping rolls at an angle; the particular construction of the feeding wheels also forming a part of the invention.

A further object is to provide a novel construction of snapping rolls in which each roll is corrugated for a portion of its length and provided with smooth portions intermediate the corrugations forming bearing portions between the rolls.

Another object is to provide snapping rolls which are open at one extremity to accommodate any length of stalk, each snapping roll being tapered at the open end in order to allow the stalks to be more easily fed thereto.

A still further object is to provide means for supporting the lower snapping roll adjacent to the open end upon rollers, the upper snapping roll being supported upon the lower roll and held in engagement therewith by means of tension devices.

A still further object of the invention is to provide means for cutting off the butt ends of the stalks as they are passed into the snapping rolls, thus preventing stalks of greater length from interfering with the operation of the machine.

The above and other objects may be attained by forming the machine in the manner hereinafter described and illustrated in the accompanying drawings, it being understood that various changes may be made in the form and details of the construction, without departing from the appended claims.

A preferred embodiment of the invention thus set forth in general terms, is illustrated in the accompanying drawings, in which—

Similar numerals of reference indicate corresponding parts throughout the several figures of the drawings.

The present invention comprises a corn husking machine provided with traction wheels and adapted to be drawn by a wagon which is arranged to guide the same around a field and move the husking machine into position adjacent a shock of corn.

The stalks are removed from the shock and placed upon the table of the machine where they may be spread out and placed upon the conveyer which automatically feeds the stalks diagonally to the snapping rolls, which remove the ears from the stalks and pass the stalks on to a binder carried upon the other side of the machine, the ears being carried by conveyers to the husking rolls which remove the husks and convey the ears to a conveyer which carries them forward to the wagon, the husks being dropped upon the stalks as they are carried to the binder, any loose kernels of shelled corn which drop from the husking rolls being deposited in a shaker and conveyed to a suitable receptacle at the rear end of the machine.

The machine is carried upon the forwardly tapered frame 1 which is preferably formed of channel iron and supported upon the front wheels 2 and rear wheels 3, the front wheels being preferably carried by the steering knuckles 4 connected to the front axle 5 in the same manner as the steering wheels of an automobile, the rear wheels being mounted upon the rear axle 6.

A pair of standards 7, preferably in the form of channel irons, are supported near the rear end of the frame 1 and are braced by means of the brace bars 8, which extend from the upper ends of said standards to the rear end of the frame. The forwardly disposed channel members 9 are connected at their rear ends to the standards 7 at a point intermediate the extremities thereof and extend forwardly to a point spaced from the forward end of the frame 1, the forward ends of said channel members 9 being connected to the inclined channel members 10 which are supported at their rear ends by connection to the upper extremities of the uprights 7.

The lower snapping roll 11 is provided with the rearwardly extending shaft 12 journaled in a bearing 13 which is mounted upon a cross bar 14, supported between the uprights 7 at a point beneath the horizontal channel members 9. A pinion 15 is mounted upon the rear end of the shaft 12 and meshes with a similar pinion 16 upon the shaft 17 of the upper snapping roll 18, a universal joint 19 being provided in the shaft 17 intermediate the roll and the rear bearing 20, which is also mounted upon the cross bar 14.

A sprocket 21 is fixed upon the rear end of the shaft 17 and connected by means of the chain 22 with the sprocket 23 mounted upon the shaft 24, a sprocket 25 being also fixed upon said shaft and connected by the chain 26 with a sprocket 27 upon the shaft 28 of the engine 29.

A sprocket 30 is mounted upon the rear end shaft 12 and connected by a chain 31, which passes over an idler pulley 32, with the sprocket 33 mounted upon the shaft 34 which is journaled in a suitable bearing 35 carried upon the adjacent upright 7. A sprocket 36 is also mounted upon the shaft 12 and connected by the chain 37 with the sprocket 38 upon the binder shaft 39.

Each of the snapping rolls is of the same construction, the forward ends thereof being tapered as shown at 40, a smooth bearing portion 41 being provided near each extremity of each roll and arranged to bear against the similar portion of the other roll, the remaining portions of each roll being provided with the longitudinal corrugations 42. If desired, inclined corrugations 43 may be provided across a portion of each of the smooth bearing portions of the snapping rolls.

The forward end of the lower snapping roll is supported upon a pair of rollers 44 and 45 mounted upon a suitable bracket 46 which is supported upon the main frame 1, these rollers engaging the smooth bearing portion at the forward end of the snapping roll 11.

The upper snapping roll shaft 17 is journaled at each end of the upper snapping roll in bearings 47, tension springs 48 being provided between said bearings and the adjusting screws 49 by means of which the upper snapping roll is held in engagement with the lower roll. The adjusting screws 49 are located through cross plates 50 carried upon the horizontal channel members 9.

A forwardly and inwardly inclined horizontal shaft 51 is connected at its rear end to the shaft 34 by means of the universal joint 52, the forward end of said shaft being journaled in the bearing 53 carried upon a bracket 54 located at the forward end of the frame 1 and beyond the forward ends of the snapping rolls.

Sprockets 55 are mounted upon the shaft 51 at spaced intervals and the conveyer chains 56 are connected to said sprockets and inclined downwardly along the inclined feeding table 57, and passing over the sprockets 58 upon the shaft 59 which is carried in suitable bearings at the lower end of said inclined table and beneath the horizontal table 60.

For the purpose of preventing the stalks from being carried up too swiftly to the snapping rolls by the conveyer chains, and in order to separate the stalks to allow one at a time to pass into the snapping rolls, a bar 61 is supported above the conveyer chains and parallel to the shaft 51 by means of the arms 62, depending arms 63 being located at intervals upon said bar and extending downwardly into proximity to the conveyer chains.

Feeding wheels 64 are mounted upon the shaft 51, one of said wheels being preferably mounted in front of the snapping rolls and the other wheel at a point near the rear end of the snapping rolls.

Figure 1:
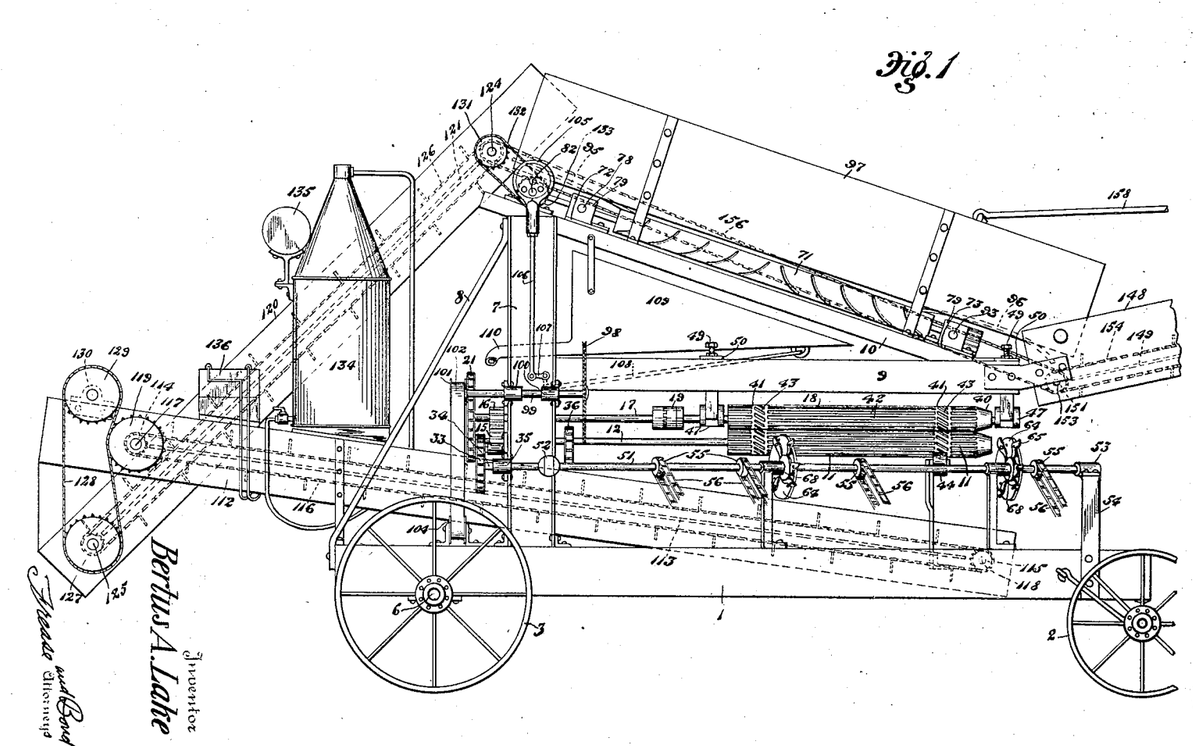
Figure 1 is a side elevation of a corn husking machine embodying the invention, the feeding table and a portion of the feeding conveyer being broken away.
Figure 2:
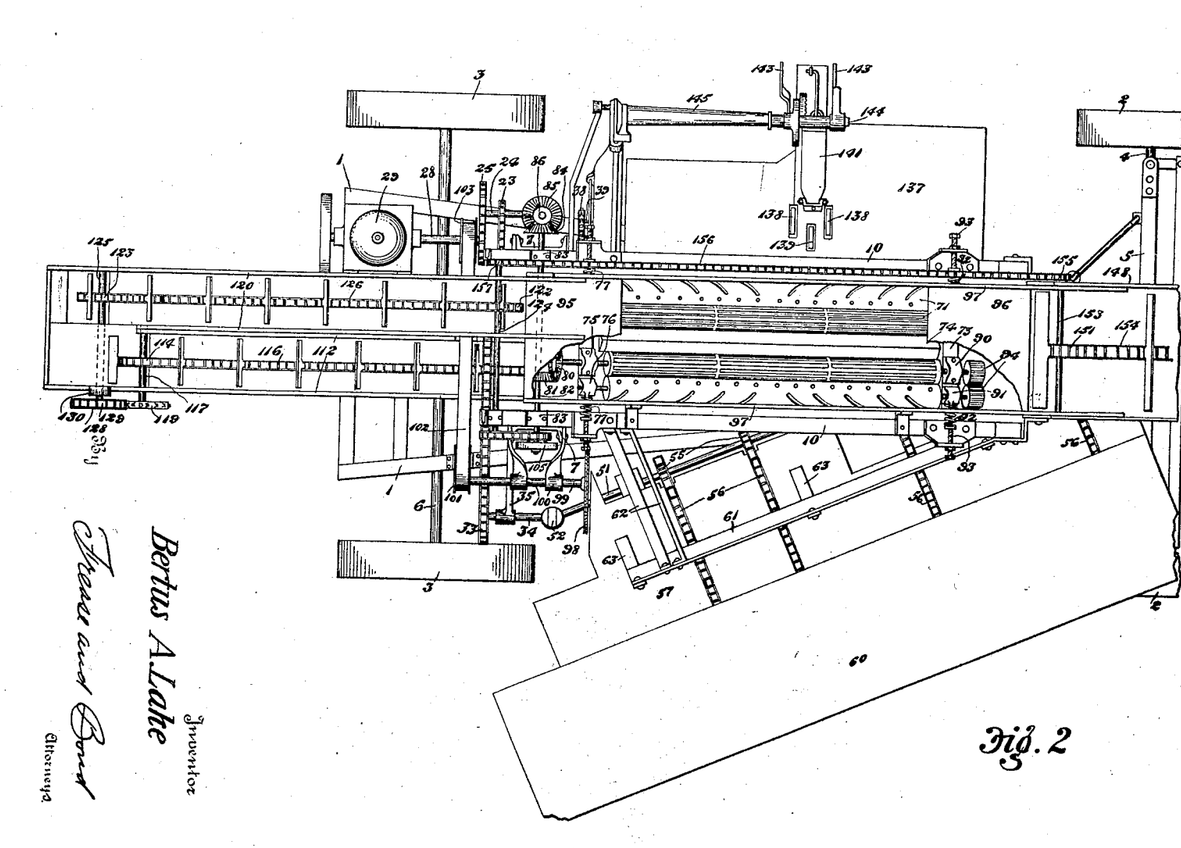
Fig. 2, a plan view of the same, parts being broken away for the purpose of illustration.
Figure 3:
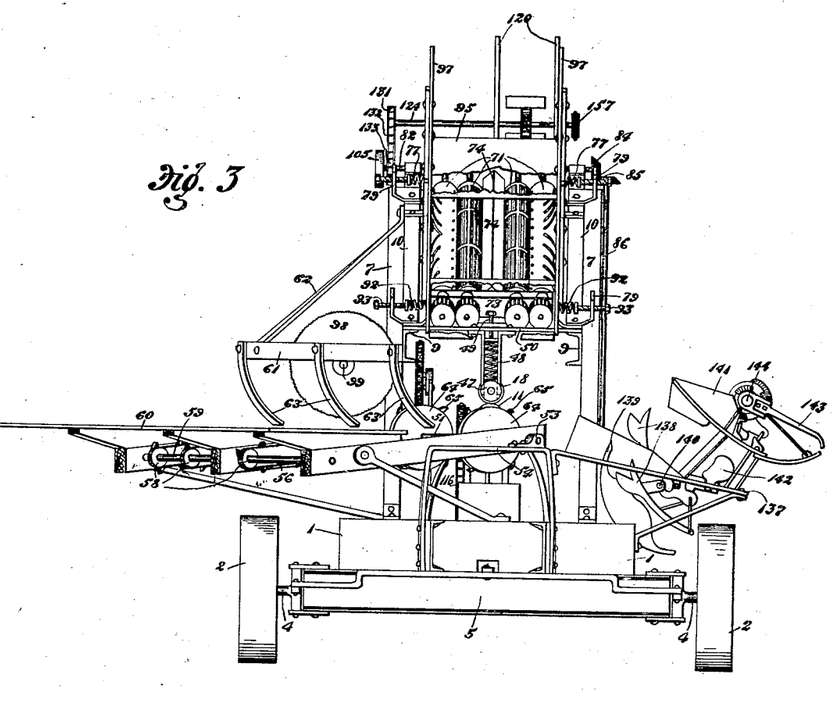
Fig. 3, a front end elevation of the machine.
Figure 4:
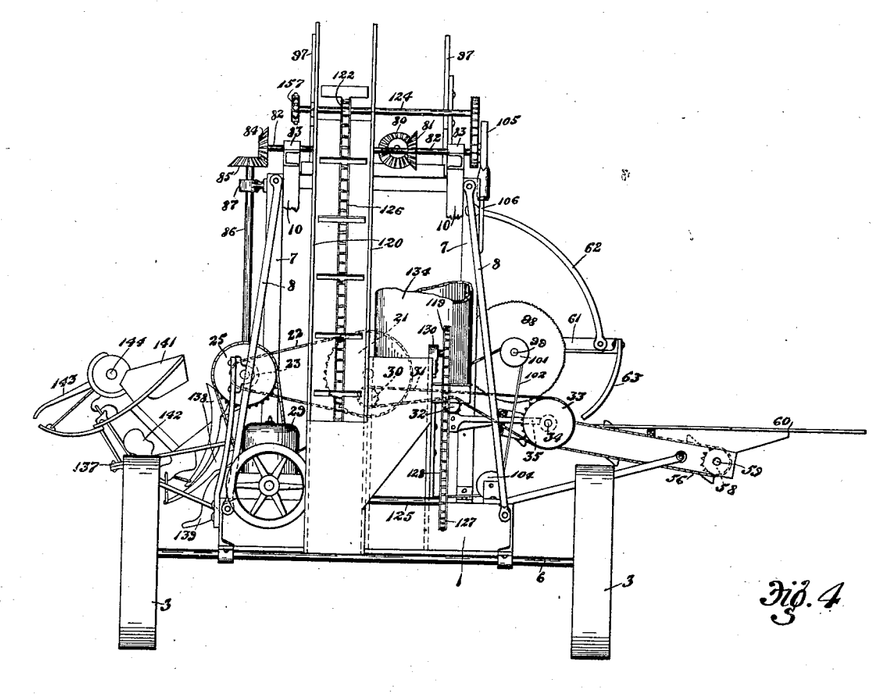
Fig. 4, a rear end elevation thereof, parts being broken away.
Figure 5:
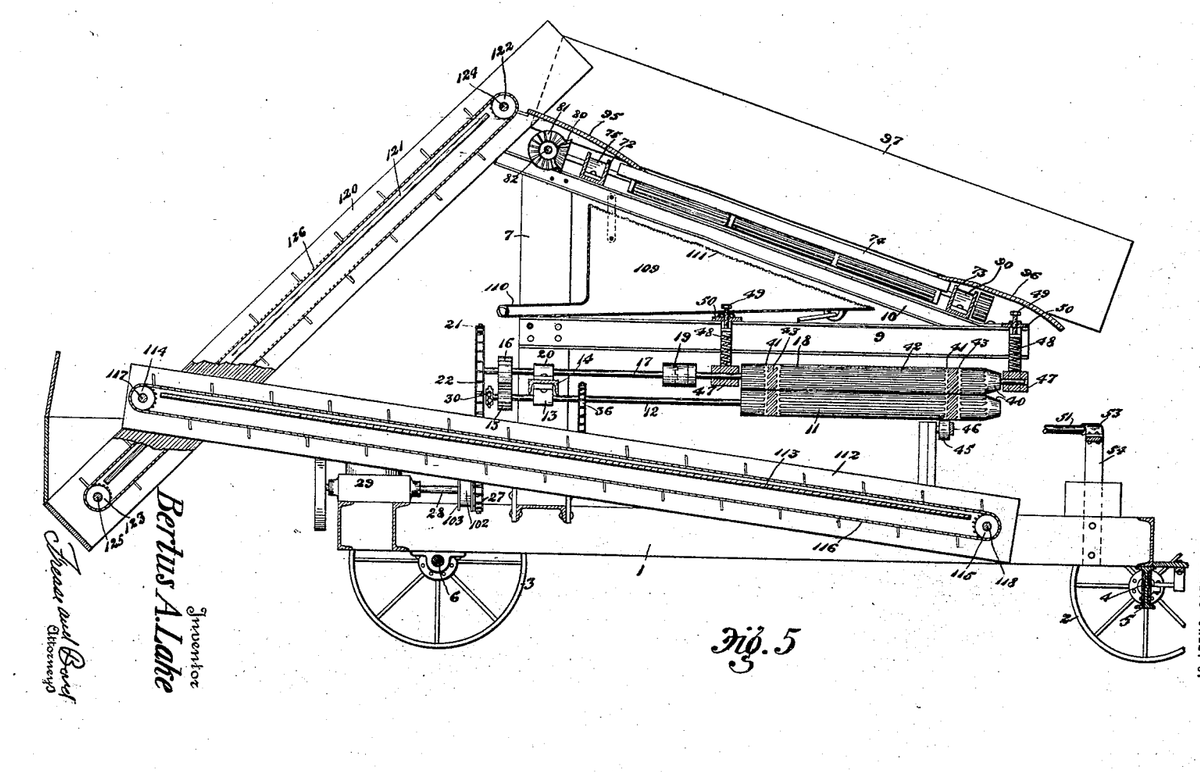
Fig. 5, a longitudinal section through the machine.
Figure 6:
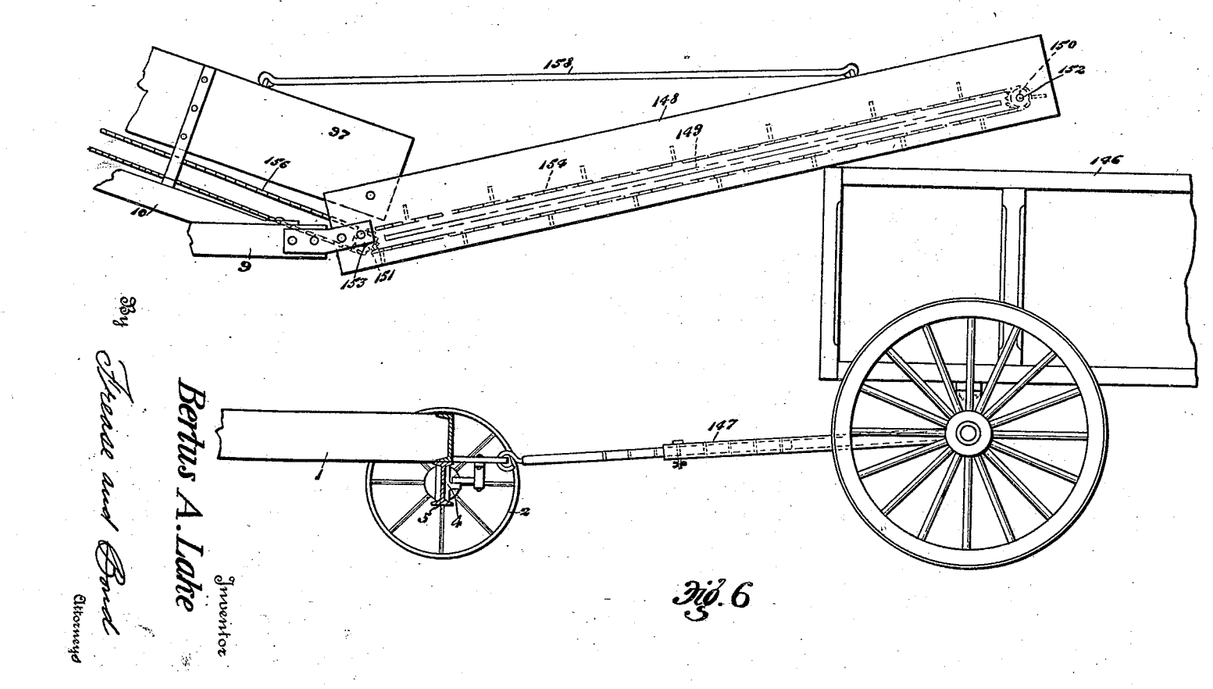
Fig. 6, a view showing the front portion of the corn husking machine and the conveyer which carries the husked ears away from the husking rolls to a wagon.
Figure 7:
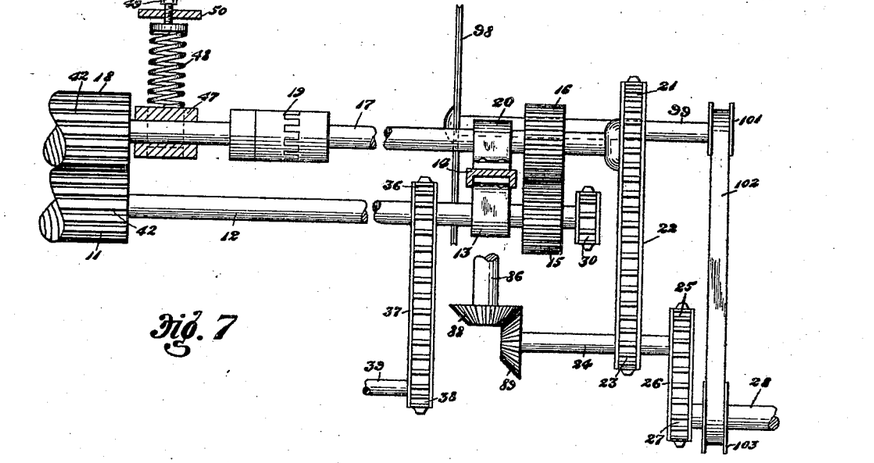
Fig. 7, an elevation of the rear end portions of the snapping rolls and the gearing associated therewith.
Figure 8:
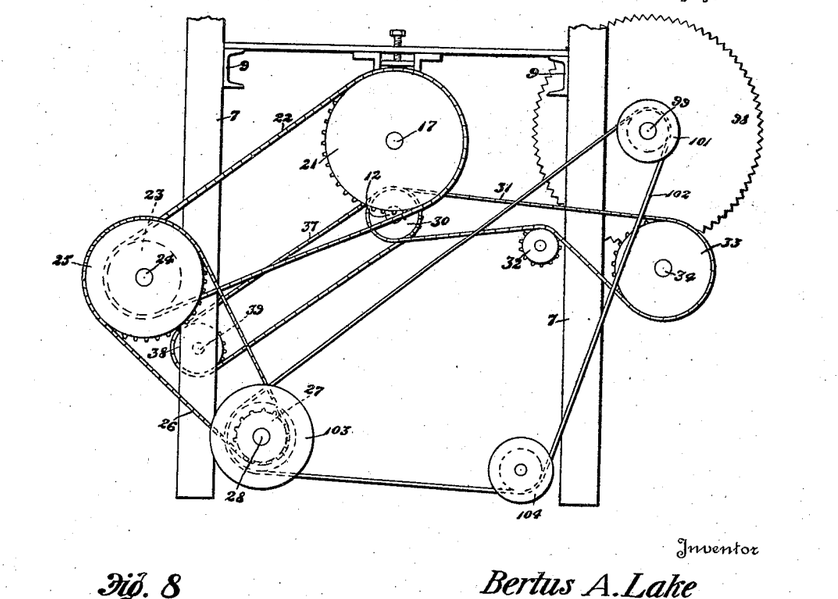
Fig. 8, an end elevation of the gearing shown in Fig. 7.
Figures 9, 10:
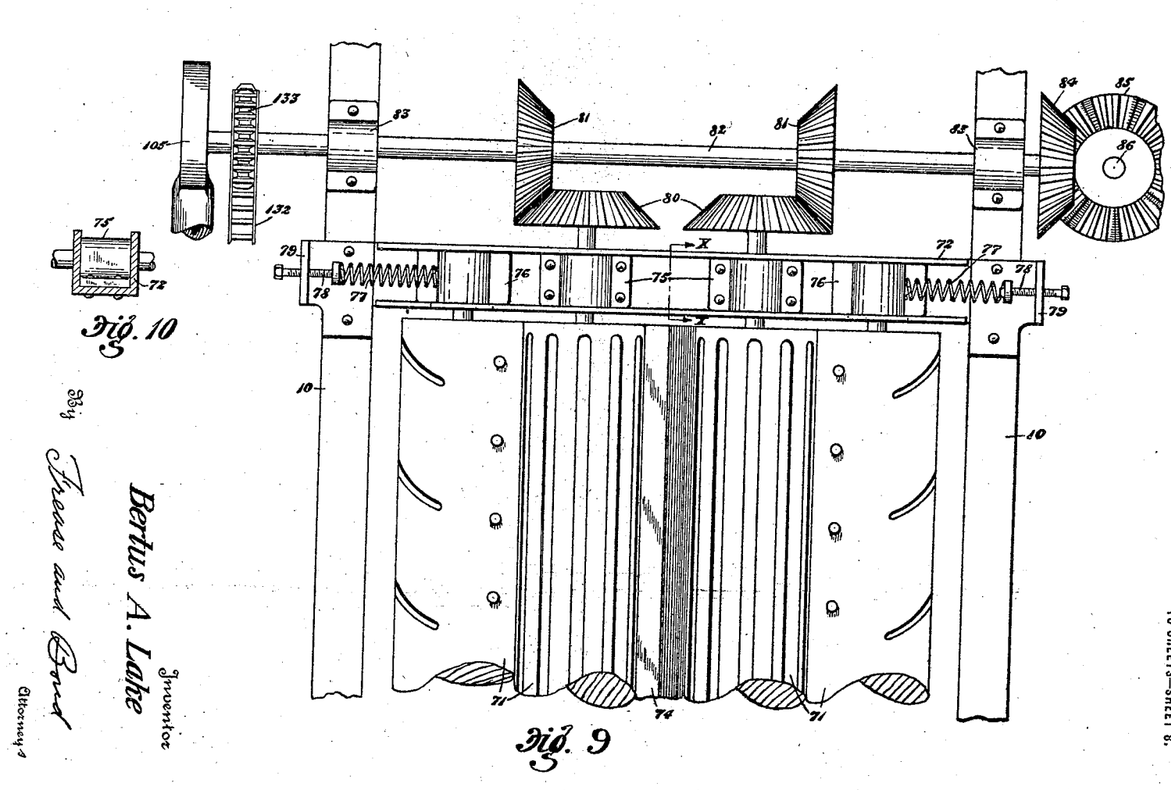
Fig. 9 a plan view of the rear end portions of the husking rolls and the gearing associated therewith.
Fig. 10, a section on the line X—X, Fig. 9.
Figures 11, 12:
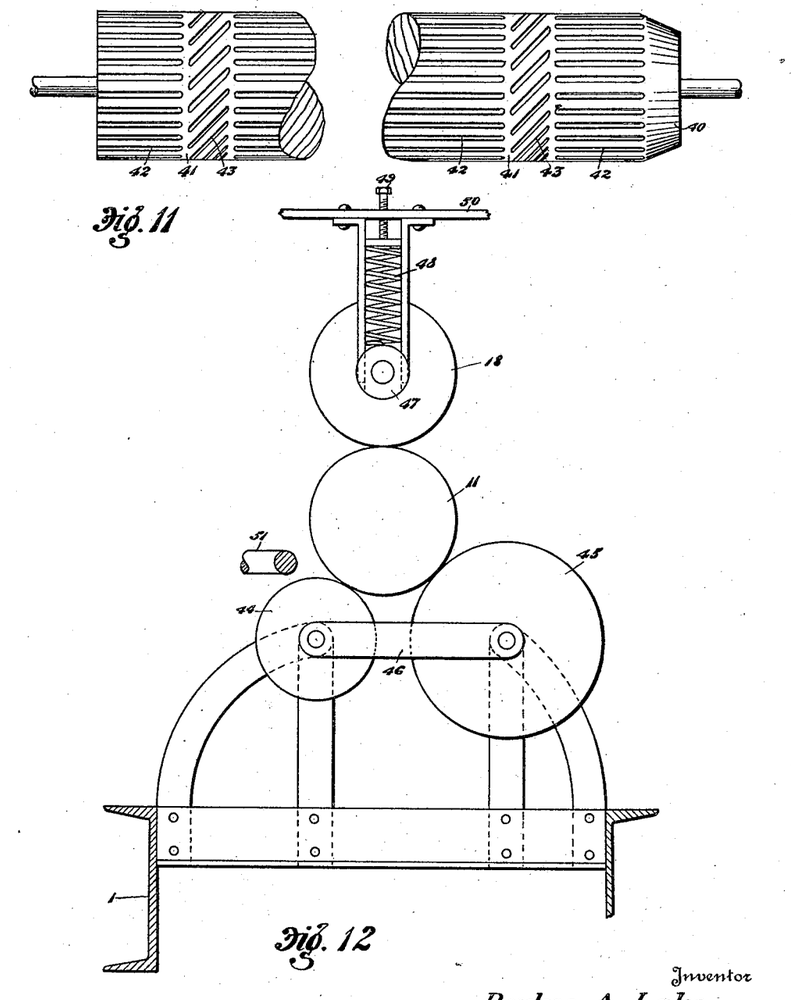
Fig. 11, a detail elevation upon an enlarged scale of one of the snapping rolls.
Fig. 12, a front end elevation of the snapping rolls, showing the means for supporting said rolls.
Figure 13:
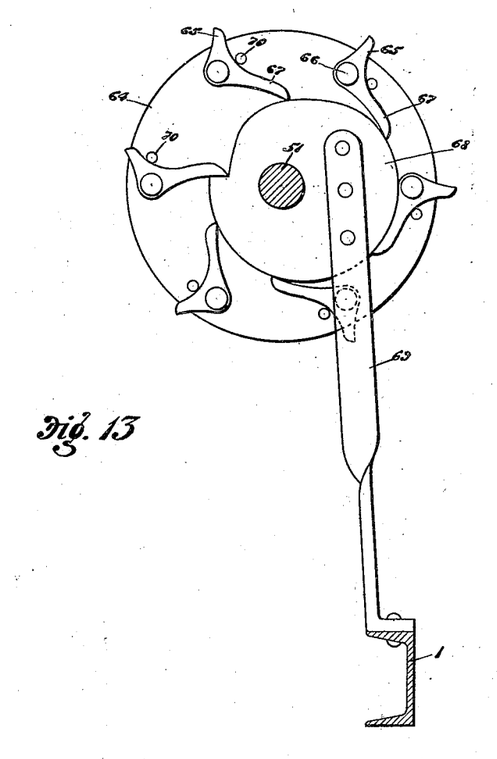
Fig. 13, an enlarged detail view of one of the feeding wheels.
Figure 14:
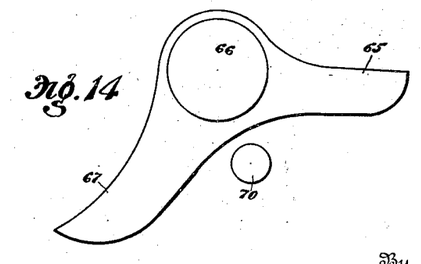
Fig. 14, an enlarged detail view of one of the feeding teeth.

As shown in Fig. 13, each of these wheels comprises the disk 64 fixed upon the shaft 51 and provided at intervals with the feeding teeth 65 which are pivoted upon said disk as at 66, each of said teeth having an angular tail portion 67 arranged to engage the periphery of the cam 68 which is fixed upon the upright 69 mounted upon the frame 1, the shaft 51 being journaled through said cam. Pins 70 are mounted in the disk 64 and prevent back movement of the teeth beyond a certain point.

As shown in Fig. 13, these teeth are held in a position to receive the stalks from the conveyer chains and carry them into the snapping rolls, the teeth as they travel around the cam, releasing the stalks as they are received by the snapping rolls. It will be seen that the feeding wheels will carry each stalk diagonally into the snapping rolls, the head end of the stalk being passed into the tapered throats of the snapping rolls ahead of the butt end thereof.

The husking rolls 71 are located above and parallel with the inclined frame members 10, being supported at their upper and lower ends in bearings mounted upon the cross bars 72 and 73 respectively. These husking rolls are preferably mounted in pairs, one pair being placed upon each side of the dividing bar 74.

The upper cross bar 72 is preferably of channel cross sectional shape, the bearings 75 for the two inner husking rolls being fixed thereon, while the bearings 76 for the two outer husking rolls are slidably mounted in said channel, tension springs 77 being interposed between said sliding bearings and the adjacent adjusting screw 78 which is located through an upturned flange 79 upon the cross bar. Each outer husking roll is thus held against the adjacent inner husking roll by means of the tension springs.

A bevel gear 80 is mounted upon the upper end of each of the inner husking roll shafts and meshes with the adjacent bevel gear 81 upon the shaft 82 which is journaled in suitable bearings 83 mounted upon the inclined side frame 10. A bevel gear 84 is mounted upon one extremity of the shaft 82 and meshes with the bevel gear 85 mounted upon the vertical shaft 86 which is journaled in suitable bearings 87 carried upon the adjacent upright channel member 7. A bevel pinion 88 is mounted upon the lower end of the shaft 86 and meshes with the bevel pinion 89 upon the shaft 24 by means of which power is conveyed to the husking rolls.

The shafts of the two inner husking rolls are journaled at their lower extremities in the bearings 90 which are fixed upon the cross bar 73, the lower ends of the outer husking rolls being journaled in the sliding bearings 91 which are slidably mounted upon said cross bar, tension springs 92 being provided between said bearings and the adjusting screws 93 for holding the outer husking rolls in engagement with the inner rolls. Pinions 94 are provided upon the lower extremities of the husking rolls, the pinions upon each pair of husking rolls meshing in order to drive the outer husking rolls from the inner husking rolls.

A metal shield 95 is located over the upper bearings and gearing of the husking rolls and a similar shield 96 is located over the lower bearings and gearing, and vertical side boards 97 are located upon each side of the husking rolls, to prevent the ears from being thrown off of the rolls as they pass thereover.

For the purpose of cutting off the butt ends of the stalks to a proper length to permit the stalks passing through the machine, a circular saw 98 may be provided upon the shaft 99 which is journaled in suitable bearings 100 upon one of the uprights 7, said shaft having a pulley 101 which is connected by means of a belt 102 with a pulley 103 upon the engine shaft, said belt being preferably also located over the idler pulley 104.

An eccentric 105 is mounted upon one end of the shaft 82, an arm 106 being connected thereto and pivotally connected at its lower end to the bell crank lever 107, which is connected by means of the link 108 with the forward extremity of a shaker 109 which is rearwardly inclined and provided with the rearwardly and downwardly disposed spout 110, a forwardly inclined screen 111 covering said shaker.

For the purpose of carrying the ears of corn, which have been snapped from the stalks by the snapping rolls, upwardly to the husking rolls, a rearwardly and upwardly inclined conveyer is provided extending from a point beneath the snapping rolls to the rear of the machine and comprises a trough formed of the spaced side boards 112 having the bottom board 113 located therebetween, sprockets 114 and 115 being located at the upper and lower extremities respectively of said trough, a conveyer chain 116 being located over said sprockets and arranged to pass over the upper surface of the bottom board 113 and beneath the lower surface thereof.

The sprockets 114 and 115 are mounted upon the shafts 117 and 118 respectively, which are journaled in the side boards 112, the shaft 117 extending beyond the trough on one side and being provided with a sprocket 119. The husks are arranged to be dropped from the rear end of this conveyer into an upwardly and forwardly inclined conveyer comprising the side boards 120 and bottom board 121, the upper and lower sprockets 122 and 123 being mounted upon the shafts 124 and 125 respectively, a conveyer chain 126 pasing over said sprockets and over and under the bottom board 121.

The shaft 125 extends out beyond the conveyer on one side and is provided with a sprocket 127, a chain 128 passing over said sprocket and over the idler sprocket 129 which is journaled in suitable bearings 130 mounted upon the conveyer 112, said chain also passing around the sprocket 119.

The shaft 124 extends outwardly through the conveyer upon one side and is provided with a sprocket 131 which is connected by means of the chain 132 with the sprocket 133 mounted upon the shaft 82.

By this construction, both of the conveyers are driven from the shaft 82.

The water tank 134, the oil tank 135 and the battery box 136 for the engine, are preferably mounted over the rear portion of the conveyer 112, as in this position they are located close to the engine and at the same time are easily accessible.

A downwardly inclined table 137 is located upon the opposite side of the snapping rolls from the feeding table and a binder is mounted thereon, this binder being of any usual construction. No claim is made to the construction of the binder, it only being necessary that some form of binder be provided in substantially the location shown in the drawings, in order to receive the stalks from the snapping rolls after the ears have been removed therefrom, and bind the same into bundles.

The binder shown in the drawings, is provided with the usual packers 138 operated in the usual manner by the packer shaft 39, the needle 139 carried upon the compressor shaft 140, the knotter 141, the trip hook 142, and discharge arms 143 mounted upon the discharge shaft 144 which is carried in the binder frame 145.

The several other parts necessary to the binder are also of the ordinary construction and the binder is driven from the engine in the manner above described. No further description of the binder is considered necessary, as no claim is made to the specific construction thereof and all of the parts are constructed and operated in the usual manner.

A conveyer is adapted to carry the husked ears from the husking rolls to the wagon 146 which is attached in front of the husking machine. This wagon is preferably attached by means of a telescoping tongue 147 which may be lengthened as the forward part of the wagon is filled with ears, thus allowing the conveyer to drop the ears into the rear portion of the wagon.

This conveyer consists of the side boards 148 and bottom board 149, the sprockets 150 and 151 being mounted upon the shafts 152 and 153 at the upper and lower ends respectively of the conveyer, a conveyer chain 154 being located over said sprockets and passing over and under the bottom board. The shaft 153 is extended beyond one side of the conveyer and provided with a sprocket 155 which is connected by means of a chain 156 with the sprocket 157 upon the shaft 124. This conveyer may be supported by the rods 158 which are connected to the side boards 97.

The operation of the machine is as follows: The stalks are removed from a shock and piled upon the horizontal table 60 where they may be spread out and separated and pushed on to the inclined table 57, and upon the conveyer chains 56 which carry them, one at a time, diagonally to the feeding wheels 64 which grip one stalk at a time and carry them diagonally into the snapping rolls, the head end of the stalk being carried ahead of the butt end and passed into the tapered outer ends of the snapping rolls, the butt ends of the stalks being all cut to the same length by the saw 98. It will, of course, be understood that while a circular saw is illustrated for this purpose, numerous other devices may be provided for shearing the butt ends of the stalks.

It is, of course, understood that as corn matures and ripens, the weight of the ears will cause the stem of each ear to bend downwardly, leaving the ripened ears of corn extending at an angle away from the stalk. Thus it will be seen that if the stalks were fed parallel to the snapping rolls, the ears would not be carried into the rolls at right angles thereto and a great deal of corn would therefore be shelled from the side of the ear coming into contact with the snapping rolls. By this construction, however, the ears are cleanly snapped from the stalks by means of the snapping rolls.

The stalks, after passing through the snapping rolls, are dropped upon the inclined table 137 and carried into the binder which in the usual manner automatically packs and binds the stalks into bundles or sheaves and ejects the same from the machine.

The ears as they are snapped from the stalks by the snapping rolls, are dropped upon the conveyer chain 116 and carried upwardly and rearwardly to the rear end of the conveyer 112 where they are deposited upon the conveyer chain 126 which carries the ears forwardly and upwardly and deposits the same in the trough of the husking rolls.

As the husking rolls are rotating continuously at a rapid speed, the ears are carried longitudinally along said rolls, the ribs and pegs upon said rolls removing every particle of husk and silk from the ears, while any loose kernels of corn which may be accidentally shelled from the ears, will be dropped upon the screen 111 of the shaker 109 passing through said screen into the shaker and being carried rearwardly and ejected from the spout of the shaker into a sack or any other suitable receptacle which may be placed in position to receive the same.

The husks which are torn from the ears, pass downwardly through the husking rolls on to the screen 111, the reciprocating movement of which throws the husks forwardly into the path of the stalks as they pass from the snapping rolls to the binder, the husks thus being carried through to the binder with the stalks and bound into the sheaves or bundles of stalks.

The husked ears pass down the inclined husking rolls and over the shield 96 and are dropped on to the conveyer chain 154 which carries them forwardly and deposits them into the wagon 146 which is mounted forwardly of the husking machine. It will be noted that the wagon is connected to the husking machine by means of the telescoping tongue 147 by means of which the distance between the wagon and the husking machine may be increased or decreased. It is preferable to have the tongue completely telescoped at the beginning of the operation in order to deposit the husked ears in the forward end of the wagon and as the front of the wagon is filled, the tongue may be lengthened from time to time, allowing the center and rear portions of the wagon to be evenly filled.

Although the drawings and above specification disclose the best mode in which I have contemplated embodying my invention, I desire not to be limited to the details of such disclosure, for, in the further practical application of my invention, many changes in form and construction may be made, as circumstances require or experience suggests, without departing from the spirit of the invention, within the scope of the appended claims.

I claim:—

1. A corn husking machine including substantially horizontal snapping rolls and a conveyer located diagonally to the snapping rolls extending transversely and co-extending with said rolls and arranged to carry stalks sidewise diagonally to said snapping rolls.

2. A corn husking machine including substantially horizontal snapping rolls, a conveyer arranged to carry stalks sidewise diagonally to the snapping rolls and feeding wheels adjacent to the snapping rolls and arranged to feed the stalks sidewise diagonally into the snapping rolls.

3. A corn husking machine including snapping rolls, a conveyer arranged to carry stalks, snapping rolls and a feeding wheel located beyond one extremity of the snapping rolls and arranged to carry the adjacent ends of the stalks diagonally into the snapping rolls.

4. A corn husking machine including a pair of substantially horizontal snapping rolls, a shaft located diagonally to said snapping rolls extending transversely and co-extensive with said rolls and conveyer chains operated by said shaft for carrying stalks sidewise diagonally to the snapping rolls.

5. A corn husking machine of the character described including a pair of substantially horizontal snapping rolls, a shaft located diagonally to the snapping rolls extending transversely and co-extensive with said rolls, conveyer chains connected to the shaft for carrying stalks sidewise diagonally to the snapping rolls, and feeding means mounted upon the shaft and arranged to receive the stalks from the conveyer chains and carry them sidewise diagonally into the snapping rolls.

6. In a corn husking machine of the character described, snapping rolls, a shaft located diagonally to the snapping rolls, conveyer chains mounted upon the shaft for carrying stalks diagonally to the snapping rolls and a feeding wheel located upon the shaft beyond one end of the snapping rolls for carrying the adjacent ends of the stalks into the snapping rolls in advance of the opposite ends of the stalks.

7. In a corn husking machine of the character described, a pair of coacting snapping rolls, each snapping roll being tapered at one extremity, rollers for supporting the lower roll near the tapered end thereof, and tension means for normally holding the upper roll in engagement with the lower roll.

8. In a corn husking machine of the character described, a pair of coacting snapping rolls, each roll being corrugated for a portion of its length and provided with spaced, smooth bearing portions intermediate the ends of said corrugated portion arranged to engage the bearing portions of the other snapping roll, each roll being tapered at one extremity.

9. In a corn husking machine of the character described, a pair of coacting snapping rolls, each roll being corrugated for a portion of its length and provided with spaced, smooth bearing portions arranged to engage the bearing portions of the other snapping roll, each roll being tapered at one extremity, the lower roll being mounted near the tapered end upon a pair of spaced rollers, and tension means for holding the upper roll in engagement with the lower roll.

10. A corn husking machine of the character described, including a pair of snapping rolls, a shaft located diagonally to the snapping rolls, conveyer chains connected to the shaft for carrying stalks diagonally to the snapping rolls, and feeding wheels upon the shaft arranged to receive the stalks from the conveyer chains and carry them diagonally into the snapping rolls.

11. A corn husking machine including a pair of snapping rolls, a conveyer arranged to carry stalks sidewise to said snapping rolls and means near one end of the snapping rolls for shearing the butt ends of the stalks before they are carried to the snapping rolls to permit the stalks being passed sidewise through the snapping rolls.

12. A corn husking machine including a pair of snapping rolls, a conveyer arranged to carry stalks sidewise to said snapping rolls, and a circular saw near one end of the snapping rolls for shearing the butt ends of the stalks before they are carried to the snapping rolls to permit the stalks being passed sidewise through the snapping rolls.

13. A corn husking machine including substantially horizontal snapping rolls, means for conveying stalks sidewise to said snapping rolls, inclined husking rolls located above and in the same vertical plane with the snapping rolls, and means for conveying ears snapped from the stalks to said husking rolls.

14. A corn husking machine including substantially horizontal snapping rolls, means for conveying stalks sidewise to said snapping rolls, inclined husking rolls located above and in the same vertical plane with the snapping rolls and a conveyer located beneath the snapping rolls for conveying ears snapped from the stalks to the husking rolls.

15. A corn husking machine including snapping rolls, means for conveying stalks to said snapping rolls and feeding wheels located adjacent to the snapping rolls and arranged to receive the stalks from the conveying means and convey them to the snapping rolls, each feeding wheel having a plurality of pivoted teeth arranged to engage the stalks and to automatically move out of engagement with the stalks as the stalks are passed to the snapping rolls.

16. A corn husking machine including snapping rolls, means for conveying stalks to said snapping rolls and feeding wheels located adjacent to the snapping rolls and arranged to receive the stalks from the conveying means and convey them to the snapping rolls, each feeding wheel having a plurality of pivoted teeth, and a cam arranged to be engaged by the teeth to automatically move the teeth out of engagement with the stalks as they are fed into the snapping rolls.

17. A corn husking machine including a pair of substantially horizontal snapping rolls, a conveyer for passing stalks sidewise through the snapping rolls, and means near one end of the conveyer for shearing off the butt ends of the stalks before they are passed to the snapping rolls.

18. In a corn husking machine of the character described, snapping rolls, a shaft located diagonally to the snapping rolls, conveyer chains mounted upon the shaft for carrying stalks diagonally to the snapping rolls and a feeding wheel located beyond one end of the snapping rolls for carrying the adjacent ends of the stalks into the snapping rolls in advance of the opposite ends of the stalks.

19. A corn husking machine including substantially horizontal snapping rolls, a conveyer located diagonally to the snapping rolls extending transversely and co-extensive with said rolls and arranged to convey stalks sidewise diagonally to the snapping rolls and a feeding wheel located beyond one end of the snapping rolls for carrying the adjacent ends of the stalks into the snapping rolls in advance of the opposite ends of the stalks.

In testimony that I claim the above, I have hereunto subscribed my name.

BERTUS A. LAKE.